Patented Feb. 12, 1946

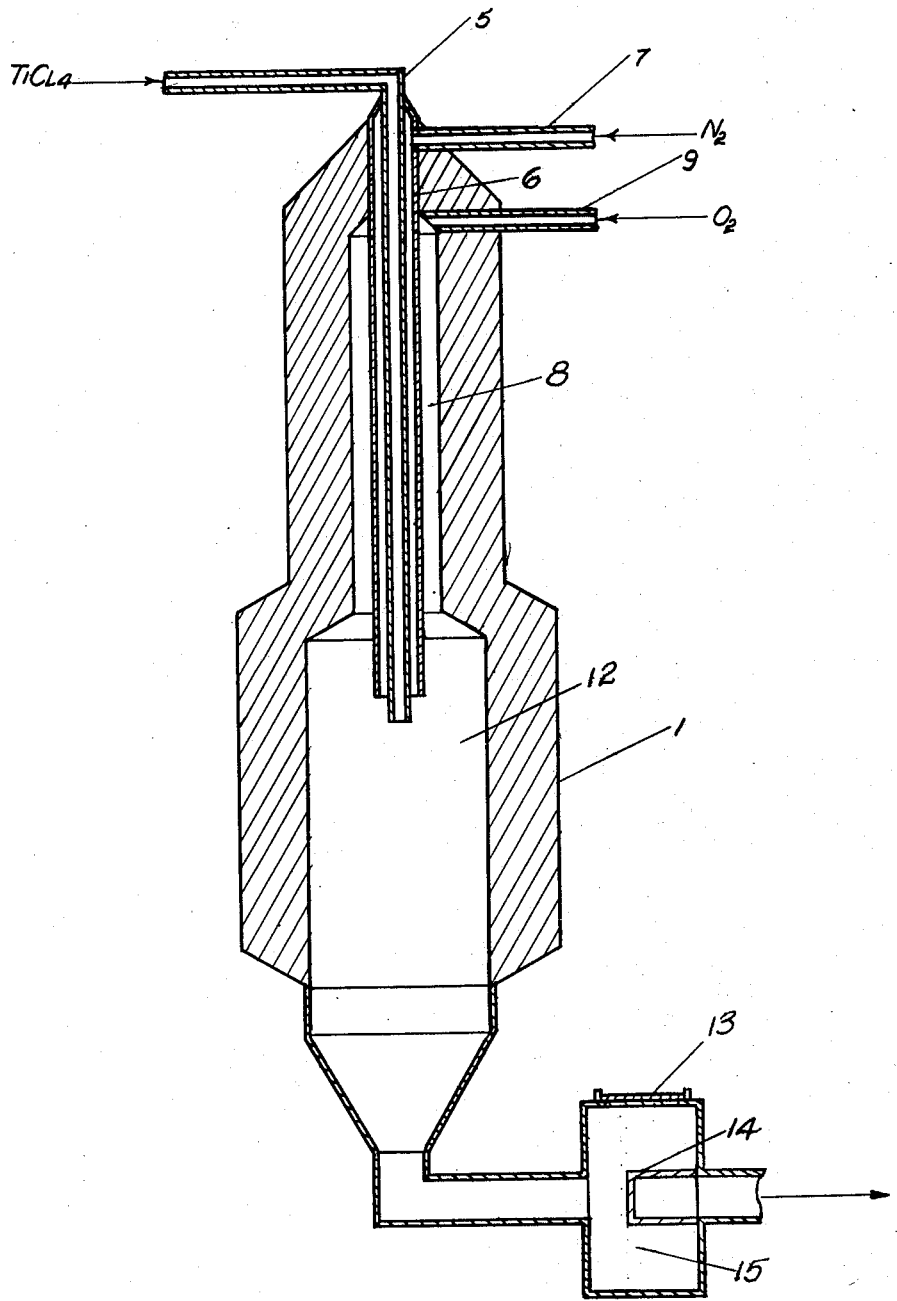

2,394,633

UNITED STATES PATENT OFFICE 2,394,633

PREPARATION OF TITANIUM DIOXIDE PIGMENT

Alphonse Pechukas and George Atkinson, Akron, Ohio, assignors to Pittsburgh Plate Glass Company, Allegheny County, Pa., a corporation of Pennsylvania Application April 4, 1941, Serial No. 386,863

5 Claims. (Cl. 23—202)

This invention relates to a method of preparing titanium dioxide from titanium halides, particularly titanium tetrachloride. In a prior application of Irving E. Muskat, Serial No. 176,647, filed November 26, 1937, which has matured into Patent No. 2,240,343, a method has been described wherein vaporized titanium tetrachloride is reacted with oxygen at a high temperature (750° C. and above) whereby a finely divided pigmentary titanium dioxide is produced in gas suspension and is thereafter removed from the suspension. In the operation of this process, the titanium dioxide produced often has been found to be off-color while otherwise having desirable pigmentary properties.

In accordance with the present invention, we have been able to avoid this difficulty. We have found that pigmentary titanium dioxide may be obtained by removal of the titanium dioxide from the gases at an elevated temperature above about 250° C., and preferably above 450° C., generally not above about 800° C. By this means a product of good color is secured. The removal of the titanium dioxide from the gaseous suspension may be effected by any convenient means, such as by settling, filtration, electrostatic or supersonic methods of precipitation, etc.

The accompanying drawing is a diagrammatic sectional view of an illustrative form of apparatus which is suitable for use in accordance with our invention. In this embodiment we provide a vertically arranged furnace 1, which is equipped with a reaction chamber 12, and preheating zone 8. Suitable heating elements (not shown) may be provided adjacent the preheating chamber 8, and the furnace may be covered partially or completely with heat insulation. Vertically disposed, concentrically arranged tubes 5 and 6, extend through the preheating zone and into the reaction space.

In the operation of this device, a stream of preheated titanium tetrachloride vapor is introduced into tube 5, and heated nitrogen or other inert gas is introduced into tube 6, through inlet tube 7, while a stream of oxygen is admitted at inlet 9. The gases passing through the preheating zone are heated to reaction temperature. Thermal decomposition of the titanium tetrachloride at the terminal portion of tube 5, is prevented by the fluid envelope of inert gas which is discharged from tube 6, about the end of tube 5, thus preventing an accumulation of oxygen adjacent the tetrachloride jet. The titanium tetrachloride vapor is swept into reaction zone 12, of suitable size such that the tetrachloride is decomposed before contact with the hot walls of the chamber can occur. It will thus be apparent that the reaction of the tetrachloride and the oxygen is effected in the vapor phase and that the reaction is conducted in a manner such that contact of the tetrachloride adjacent the hot surfaces within the chamber is substantially minimized in order to prevent or minimize formation of crystalline titanium dioxide.

It should be understood that the method of preparing titanium dioxide as described herein merely is illustrative and that various other methods of decomposing titanium tetrachloride to produce titanium dioxide may be used. For example, the process may be conducted by introducing streams of vaporized titanium tetrahalide and oxygen or air in opposite directions into a reaction chamber and withdrawing the products of reaction along the tetrahalide inlet, whereby an envelope of the evolved halogen such as chlorine is formed about the inlet. This process is described in copending application Serial No. 271,694, filed May 4, 1939, by Irving E. Muskat and Alphonse Pechukas.

As a further means of insuring the production of a finely divided product and minimizing formation of crystals, it is generally desirable to maintain the temperature of the walls of the reaction chamber substantially below the temperature of the main reaction zone. Thus, while the temperature in the central portion of the chamber where the major portion of the reaction occurs may be 750 to 1100° C., the temperature of the walls is generally maintained below 750° C. and often 600° C., or below.

The exhaust gases containing chlorine and suspended titanium dioxide are conveyed to a filter chamber 15, which is provided with a suitable filter 14. This filter may be of any convenient structure such as a plate or tube filter and may comprise porous alundum, porous carborundum or other resistant porous filter medium. In accordance with a convenient modification, the filter may comprise one or a plurality of porous aluminum oxide filter candles whereby the gases may be withdrawn through the walls thereof into the interior of the candle and may be subsequently discharged. Preferably, the titanium dioxide is collected on the exterior side of the candle. In accordance with the present invention, care is taken to insure the removal of the titanium dioxide from the gases while the temperature of the gases remains above about 250° C., preferably 450 to 800° C. Heat may be applied to the filtration chamber, if necessary, in order to maintain the temperature at the required value. To maintain the process in substantially continuous operation, a plurality of chambers 15, may be provided together with means for changing the flow of the gases containing the titanium dioxide from one chamber to another when the one chamber has become filled with the collected titanium dioxide.

At all events, when the chamber is so filled or the filter becomes clogged, flow of the $TiO_2$ suspension to the chamber is discontinued and air or other inert gas is introduced in order to remove adsorbed chlorine or chlorine compounds. During this treatment the titanium dioxide is preferably maintained at a temperature above about 250° C., preferably above 450° C. and generally not in excess of about 800° C., and if desired, it may be subjected to calcination at a temperature of 400° C. to 750° C. before removal of the titanium dioxide from the chamber.

In order to remove the titanium dioxide from the filter surface, air or other inert gases may be introduced into the chamber in a direction opposite to the flow of the reaction products through the filter. By this means, particles of $TiO_2$ which have become embedded in the pores of the filter plate or filter candle are forced off the surface of the filter and the filter is thereby cleaned for further use. Thereafter, the pigment may be removed through a suitable outlet, such as outlet 13, provided at the top of the chamber, or if desired, through a discharge chute provided at the bottom of the chamber.

If desired, the calcination may be effected by heating the air or other inert gas which is passed through the chamber to a suitable temperature, for example, 750° C. This calcination may be continued until the chlorine and other impurities are driven off from the pigment. Two hours at 600° C. is found to be suitable for most purposes.

If desired, the process may be conducted to produce extended pigments by decomposing a mixture of titanium halides with another oxidizable halide. For example, zinc chloride, aluminum chloride or silicon tetrachloride may be introduced with the titanium tetrahalide to produce a mixture of white pigments or chromic chloride, cobalt chloride, vanadium chloride, etc., may be introduced in order to impart a tint to the product.

In accordance with a further modification, methods other than filtration may be utilized to remove suspended $TiO_2$. For example, the $TiO_2$ may be precipitated by subjection of the gases to supersonic vibrations such as are obtained from a quartz crystal or to electrostatic or electromagnetic precipitation.

This process is not limited to the oxidation of the tetrachloride but may be applied to the oxidation of other halides such as titanium trichloride, titanium tetrafluoride, etc. The invention is particularly adapted to the production of titanium dioxide by reacting titanium halide with oxygen including oxygen containing gases such as air. However, it may also be applied to the recovery of titanium dioxide from gaseous dispersions produced by hydrolysis of vaporized titanium halides, for example, by hydrolysis of titanium tetrachloride with steam at 800° C.

Although the invention has been described in connection with the details of certain embodiments thereof, it is not intended that such details shall be considered as limitations upon the invention except insofar as included in the accompanying claims.

We claim:

1. In the method of producing titanium dioxide by reaction of gaseous oxygen with a titanium halide wherein a suspension of titanium dioxide in the reaction gases is produced, the step which comprises separating the reaction gases from the titanium dioxide at a temperature not less than about 450° C.

2. In the method of producing titanium dioxide by reaction of gaseous oxygen with titanium tetrachloride wherein a suspension of titanium dioxide in the reaction gases is produced, the step which comprises separating the reaction gases from the titanium dioxide at a temperature not less than about 450° C.

3. In the method of producing titanium dioxide by reaction of gaseous oxygen with titanium tetrachloride wherein a suspension of titanium dioxide in the reaction gases is produced, the step which comprises separating the reaction gases from the titanium dioxide at a temperature not less than about 450° C. and below about 800° C.

4. In the method of producing titanium dioxide by reaction of gaseous oxygen with titanium tetrachloride wherein a suspension of titanium dioxide in the reaction gases is produced, the step which comprises separating the reaction gases from the titanium dioxide at a temperature not less than about 450° C. and calcining the recovered titanium dioxide.

5. In the method of producing titanium dioxide by reaction of gaseous oxygen with vaporized titanium tetrachloride wherein a suspension of titanium dioxide in reaction gases is produced, the step which comprises separating the reaction gases from the titanium dioxide at a temperature not less than about 450° C.

ALPHONSE PECHUKAS.
GEORGE ATKINSON.